US006420516B1

(12) United States Patent
Tau et al.

(10) Patent No.: US 6,420,516 B1
(45) Date of Patent: Jul. 16, 2002

(54) FINISHING DESIGN TO INCREASE THE POLYMER CONTENT IN AN OLEFIN SOLUTION POLYMERIZATION PROCESS

(75) Inventors: Li-Min Tau, Lake Jackson; Robert O. Swindoll, Clute; Che-I Kao; Pradeep Jain, both of Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/555,915

(22) PCT Filed: Dec. 23, 1998

(86) PCT No.: PCT/US98/27363

§ 371 (c)(1),
(2), (4) Date: Jun. 6, 2000

(87) PCT Pub. No.: WO99/32525

PCT Pub. Date: Jul. 1, 1999

Related U.S. Application Data

(60) Provisional application No. 60/068,623, filed on Dec. 23, 1997.

(51) Int. Cl.[7] .................................................. C08F 6/10
(52) U.S. Cl. ...................... 528/501; 528/481; 528/503; 526/65; 526/67; 526/68; 526/70; 159/47.1
(58) Field of Search ................................. 528/481, 501, 528/503; 159/47.1; 526/65, 67, 68, 70

(56) References Cited

U.S. PATENT DOCUMENTS

| | | | |
|---|---|---|---|
| 2,897,184 A | * 7/1959 | Kimble et al. ............... | 528/501 |
| 4,250,288 A | 2/1981 | Lowery, Jr. et al. ......... | 526/137 |
| 4,271,060 A | * 6/1981 | Hubby ..................... | 528/501 X |
| 4,314,912 A | 2/1982 | Lowery, Jr. et al. .... | 252/429 B |
| 4,319,011 A | 3/1982 | Lowery, Jr. et al. ......... | 526/137 |
| 4,547,475 A | 10/1985 | Glass et al. .................. | 502/115 |
| 4,686,279 A | 8/1987 | Nagtzaam et al. ........... | 528/501 |
| 4,906,329 A | * 3/1990 | Tominari et al. ........ | 528/501 X |
| 5,314,579 A | 5/1994 | Sung .......................... | 159/47.1 |
| 5,470,933 A | 11/1995 | Mignani et al. ............... | 528/24 |
| 5,512,693 A | 4/1996 | Rosen et al. .................... | 556/7 |
| 5,556,928 A | 9/1996 | Devore et al. ............... | 526/127 |

FOREIGN PATENT DOCUMENTS

| | | | |
|---|---|---|---|
| DE | 2116939 | 4/1971 | ............. C08F/1/88 |
| EP | 0 899 273 A1 | 3/1999 | ............. C08F/6/10 |

OTHER PUBLICATIONS

Williams, T., et al., *Polymer Letters*, The Construction of a Polyethylene Calibration Curve for Gel Permeation Chromatography Using Polystyrene Fractions, vol. 6, pp. 621–624 (1968).

* cited by examiner

*Primary Examiner*—Fred Teskin

(57) ABSTRACT

The polymer recovery capacity of solution polymerization units is increased by flashing a polymer solution exiting olefin polymerization reactors to produce a concentrated polymer solution having a reduced temperate and a solids content from 10 percent to 40 percent by weight. Flashing of the polymer solution preferably occurs at a temperature at least 20° C. higher than the crystallization temperature of the concentrated polymer solution The concentrated polymer solution can be prepared adiabatically and can be subsequently finished in conventional polymer recovery units without increasing the risk of gel formation.

24 Claims, 2 Drawing Sheets

FINISHING DESIGN TO INCREASE THE POLYMER CONTENT IN AN OLEFIN SOLUTION POLYMERIZATION PROCESS

This application is a 371 of PCT/US98/27363, filed on Dec. 23, 1998, U.S. provisional application No. 60/068,623, filed Dec. 23, 1997.

The present invention relates to polymerization of olefins in a solution process. More specifically, the invention relates to recovery techniques for removing the polymer products from the polymer solution.

Solution polymerization of monomers containing ethylenic unsaturation is used to prepare many polymers, including polyethylene, polypropylene and a variety of copolymers. Existing solution polymerization units were designed and constructed at a time when catalyst activity was low compared to currently available catalysts. Many such polymerization units were originally designed to have adequate polymer recovery units for each reactor, or each series of reactor stages, based on the polymer yields from catalysts available at the time. Ziegler-Natta catalysts, such as those described in U.S. Pat. Nos. 4,314,912, 4,250,288, 4,319,011, and 4,547,475, provide higher yields of improved polymers such as DOWLEX™ linear low density polyethylene (LLDPE) polymers, which are available from The Dow Chemical Company.

Polymer recovery units are known in the prior art. U.S. Pat. No. 4,686,279 (equivalent to EP-A-0 102 122) discloses a device on a process of recovering polymer from solution. In particular, solutions obtained from the polymerization of ethylene, with or without one or more α-olefins having at least three carbon aroms, can be directly fed into the evaporating zone of the device. The melted polymer mass is then passed on to an extruder and a resulting polymer melt may be obtained whose content of volatile components may be lower than 500 parts per million.

Another polymer recovery design is taught in German patent DE-A-21-16-939 wherein a solution obtained from the polymerization of ethylene is heated, flashed to concentrate the solution, reheated, and fed into a finishing device.

Conversion of the solution polymerization process from using Ziegler-Natta catalysts to more advanced catalysts may not increase polymer production rates because of the limited capacity of the polymer recovery units. Absent additional polymer recovery units, the solution polymerization units must be operated below reactor capacity. Furthermore, the cost of an additional polymer recovery unit may not be justified in a competitive market.

Considerable research has been devoted to improving the profitability of existing solution polymerization units by providing more controllable catalysts to produce more valuable ploymers. For example, the single site constrained geometry catalysts described in U.S. Pat. Nos. 5,470,933, 5,556,928, and 5,512,693 provide polymers having substantially improved properties. Success with new catalysts can improve profitability of existing solution polymerization units. However, it would be desired to enjoy the higher activity of the catalysts without adding additional polymer recovery units.

An existing solution polymerization unit for making polyolefins, e.g., ethylene homopolymers and interpolymers, propylene homopolymers and interpolymers, etc., is shown in FIG. 1 (Prior Art). While FIG. 1 may be applied to other polyelefins, for simplicity it is discussed herein with respect to polyethylene. The existing unit includes a first stage continuous stirred tank reactor (CSTR) 10 and a second stage CSTR 12. Raw materials, including solvent, ethylene, 1-octene, trace amounts of hydrogen, and catalyst, are fed to the first stage reactor 10 through one or more feed lines 14. An interim polymer solution produced in the first stage reactor 10 then passes from the first reactor 10 to the second reactor 12 through a connecting line 16. The interim polymer solution typically has a temperature below about 200° C. and a polymer content from 3 percent to 16 percent by weight.

The polymer solution from the second stage reactor 12 typically has a temperature below about 220° C. and a polymer content from 3 percent to 24 percent by weight. The polymer typically comprises polyethylene or copolymers of ethylene and other α-olefin monomers. A second feed line 18 optionally feeds raw materials, for example, ethylene, α-olefin, solvent, hydrogen, etc., to the second stage reactor 12 to raise the polydispersity of the polymer product. The weight average molecular weight of the polymer ranges from 2,000 to 1,000,000, occasionally more, and, typically, in the case of polyethylene, 2,000 to 500,000. The polydispersity of the polyethylene ranges from 1.5 to 10.0.

The polymer solution from the second stage reactor 12 flows through a discharge line 20 to a first stage heat exchanger 22, and then flows through an entry line 24 to a first stage polymer finishing unit such as a devolatilization vessel 26. A polymer product exits the devolatilization vessel 26 through a product line 30 and gaseous monomer and vapor exit the vessel 26 through a recycle line 28. Devolatilization could occur in one or more stages although only a single stage is shown in the drawings. Alternatively, polymer recovery could be achieved by one or more hot water washes. Prior to entering the heat exchanger 22, the polymer solution is heated only by the exothermic polymerization reaction, that is the heat of polymerization. Heating and devolatilization of the polymer solution during polymer recovery can be done in one or more stages to maintain the polymer temperature below 260° C.

To minimize polymer degradation which leads to gel formation, the polymer temperature exiting the devolatilization vessel 26 is preferably less than 200° C. Furthermore, unreacted raw materials exiting the devolatilization vessel 26 through the recycle line 28 must be cooled for recycling.

Using Ziegler-Natta catalysts, such as $TiCl_3/MgCl_2$ catalysts, in the solution polymerization unit of FIG. 1, results in increased polymer yield until the heat exchangers 22 run at maximum capacity for polymer recovery. Additional heat exchangers could be added, however, additional cooling would also be required for cooling of recycled raw materials. Moreover, the polymer would have to be heated to higher temperatures or remain at high temperatures for a longer period of time, and would result in greater polymer degradation.

Replacing Ziegler-Natta catalysts with metallocene catalysts or constrained geometry catalysts in the solution polymerization unit of FIG. 1 improves profitability of the unit by making a more valuable product although at a lower yield than could be achieved with the Ziegler-Natta catalysts. However, the yield remains high in comparison to original design criteria such that the heat exchangers 22 still run at maximum capacity and are still a bottleneck in the process. Thus, profitability could be further improved by increasing polymer recovery capacity to match increases in polymer production capacity.

Therefore, there is a need for an improvement to existing solution polymerization units which provides for increased polymer recovery capacity to increase reactor utilization. Ideally, the improvement would increase the energy efficiency of the process without requiring a substantial redesign of the polymer recovery units. It would be desirable if such an improvement could be retrofitted with minimum capital cost or included in future construction of this and other solution polymerization units.

The present invention improves the polymer recovery capacity of solution polymerization units by flashing a polymer solution exiting polymerization reactors to produce a concentrated polymer solution having a reduced temperature and a polymer content from 10 percent to 40 percent by weight. The concentrated polymer solution can be prepared without the addition of thermal energy and can be devolatilized in conventional polymer recovery units without increasing the risk of gel formation.

One aspect of the invention provides a solution polyolefin process, comprising the steps of: polymerizing one or more olefins in a sufficient amount of solvent to produce a polymer solution having a polymer content from 3 percent to 24 percent by weight, preferably 6 percent to 18 percent by weight, wherein the polymer solution comprises a polymer having a weight average molecular weight from 2,000 to 1,000,000 and a temperature of at least about 150° C.; flashing the polymer solution, without preheating, to produce a concentrated polymer solution having a reduced temperature and a polymer content from 10 percent to 40 percent by weight; and finishing the concentrated polymer solution. This process provides adiabatic flashing of the polymer solution using heat from the polymerization reaction, which reaction may occur in more than one stage. The adiabatic flashing of the polymer solution preferably occurs at a temperature above the crystallization temperature of the concentrated polymer solution, preferably at least about 20° C., and more preferably at least about 30° C. above the crystallization temperature. The process is particularly suited for the polymerization of ethylene and/or ethylene and one or more alpha-olefins and/or dienes.

Another aspect of the invention provides a solution polyolefin process, comprising the steps of: polymerizing one or more olefin monomers in a sufficient amount of solvent in a first stage reactor to produce an interim polymer solution having an interim polymer content less than about 16 percent by weight; polymerizing the interim polymer solution in a second stage reactor to produce a polymer solution having a polymer content from 3 percent to 24 percent by weight, preferably between 6 percent and 18 percent by weight, wherein the polymer solution comprises a polymer having a weight average molecular weight from 2,000 to 1,000,000 and a temperature of at least about 150° C., preferably between 180° C. and 230° C. adiabatically flashing the polymer solution, without a preheat, to produce a concentrated polymer solution having a solids content from 10 percent to 40 percent by weight; and devolatilizing the concentrated polymer solution.

The flash is preferably positioned at the point of highest temperature exiting the reactors. Therefore, in the aspect of the invention comprising at least a first stage reactor and a second stage reactor, the flash can be positioned between the reactor stages. Such positioning of the flash is preferred if the first stage reactor operates at a higher temperature than the subsequent reactor stages. Additionally, positioning the flash between reactor stages is preferred if a purpose of the process is to have a higher polymer reaction concentration during the later reactions such as when the desired end product is a polymer with a relatively large amount of long chain branches (for example, in excess of about 1 long chain branch in 1000 carbon atoms). Furthermore, the flash may be positioned after each reactor in which sufficient temperature is generated. Such multiple flash steps allow the achievement of higher polymer content in the solution.

In yet another aspect of this invention, the flash can occur in the reactor itself. This flash can be augmented by the addition of a gas, such as ethylene, and this in turn allows the operation of the flash at a temperature lower than about 150° C. but preferably greater than about 50° C.

The olefin monomers may be introduced to both the first stage reactor and the second stage reactor.

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Figure 1:
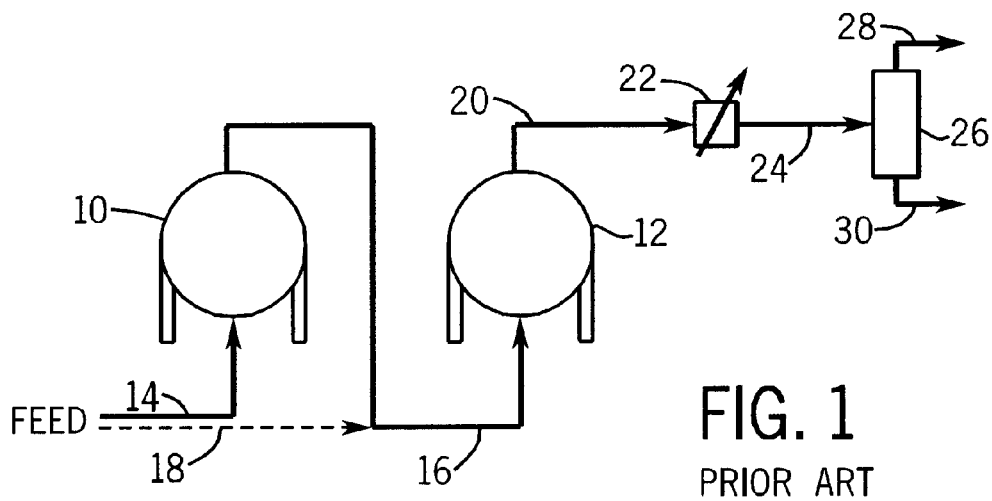
FIG. 1 (Prior Art) is a schematic diagram of components in an existing solution polymerization unit for making polyethylene.

The present invention provides an improved process for preparing olefin polymers. Typical olefin polymers include ethylene or propylene homopolymers and interpolymers, with interpolymers referring to copolymers and higher order polymers of ethylene or propylene with one or more additional ox-olefins or vinylidene aromatic or hindered aliphatic comonomers. Preferred comonomers include $C_3$–$C_{20}$ α-olefins, more preferably 1-butene, isobutylene, 1-pentene, 1-hexene, 4-methyl-1-pentene, 1-heptene, 1-octene, etc., and styrene.

Optionally, the interpolymer may further be prepared from one or more diene monomers, which are typically non-conjugated dienes having from 6 to 15 carbon atoms. Representative examples of suitable non-conjugated dienes include:

a) Straight chain alicyclic dienes such as 1,4-hexadiene, 1,5-heptadiene, and 1,6-octadiene;

b) branched chain alicyclic dienes such as 5-methyl-1,4-hexadiene, 3,7-dimethyl-1-6-octadiene, and 3,7-dimethyl-1,7-octadiene;

c) single ring alicyclic dienes such as 4-vinylcyclohexene, 1-allyl-4-isopropylidene cyclohexane, 3-allylcyclopentene, 4-allylcyclohexene, and 1-isopropenyl-4-butenylcyclohexane;

d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbomene, 5-methylene-6,6-dimethyl-2-norbornene, 5-propenyl-2-norbornene, 5-(3-cyclopentenyl)-2-norbomene, 5-ethylidene-2-norbomene, 5-cyclohexylidene-2-norbomene, etc.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene (although a conjugated diene), 4-vinylcyclohexene, etc.

The preferred terpolymers for the practice of the invention are terpolymers of ethylene, propylene and a non-conjugated diene (EPDM). Such terpolymers are commercially available.

The term "continuous stirred-tank reactor," or "CSTR," as used herein, refers to a tank reactor to which reactants are continuously fed and product is continuously withdrawn. The CSTR is agitated such that there is a close approximation of perfect back mixing.

The term "boiling reactor," as used herein, refers to a reactor operated at conditions such that both a liquid phase and a vapor phase are present. At least part of the solvent and monomer introduced into the reactor as a liquid are vaporized and exit the reactor as a vapor, thereby removing part of the heat of polymerization which results in a higher polymer concentration in the liquid stream that exits the reactor. The vapor stream that exits the reactor is cooled and recycled to the reactor. Any liquid that is condensed in this cooling process is also recycled to the reactor. These reactors are typically well mixed and can be mixed simply by the introduction of the vapor recycle stream; however the mixing can be augmented by means of mechanical agitation. The boiling reactor can be used by itself or in combination with other boiling reactors, CSTRs, loop reactors, or any other reactor for making polyolefins, and can be a single or multi-stage reactor.

The term "adiabatically flashed," as used herein, refers to a flashing step in which no heat is added to the polymer solution between the reactor or reactors and the flashing vessel.

In a first embodiment, the present invention provides a solution polymerization process, comprising the steps of (1) polymerizing one or more α-olefin monomers in a sufficient amount of solvent to produce a polymer solution having a polymer content from 3 percent to 24 percent by weight, preferably 6 percent to 18 percent by weight, wherein the polymer solution comprises a polymer having a weight average molecular weight from 2,000 to 1,000,000, or occasionally even higher, at a temperature of at least about 150° C., preferably between 180° C. and 260° C., and most preferably between 190° to 230° C.; adiabatically flashing the polymer solution, without preheating, to produce a concentrated polymer solution having a reduced temperature and a polymer content from 10 percent to 40 percent by weight, and (3) finishing the concentrated polymer solution such that it has a solvent content which is sufficiently low to permit pelletization. The concentrated polymer solution can be prepared without the addition of energy. The concentrated polymer solution also can be finished by devolatilization in conventional polymer recovery units or by hot water washing without increasing the risk of gel formation.

The concentrations and temperatures of the preferred reaction product will vary depending on the catalysts used, the monomers selected and the desired end product. However, the temperatures and concentrations disclosed herein encompass all such reaction products resulting from solution polymerization.

Figure 2:
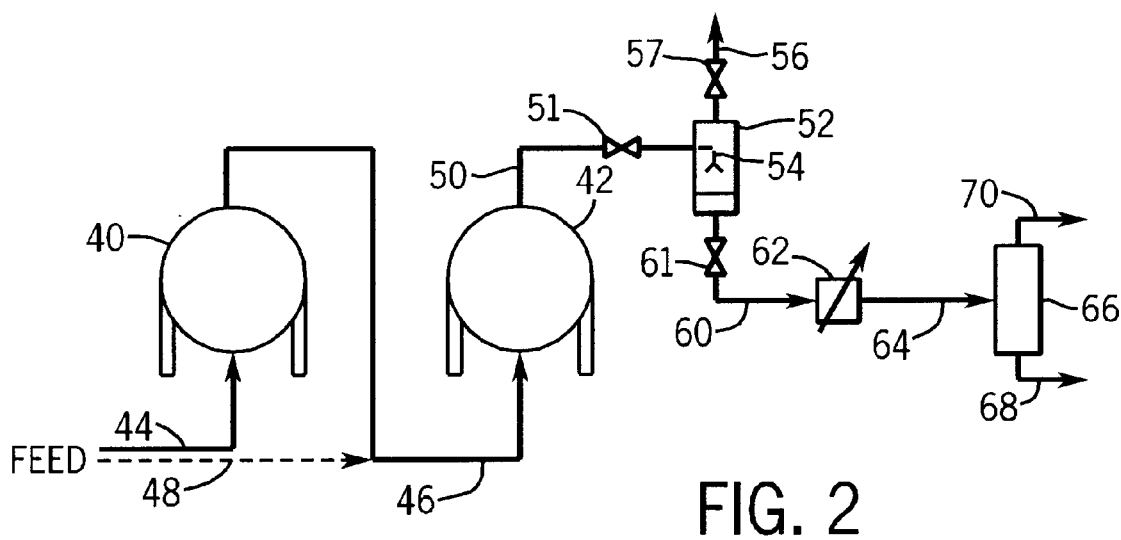
FIG. 2 is a schematic diagram of the solution polymerization unit of FIG. 1 after retrofitting for the addition of an adiabatic flash unit for flashing the polymer solution in accordance with the present invention.

A solution polymerization unit for making polyolefins, such as propylene homopolymers and interpolymers and ethylene homopolymers and interpolymers, according to the present invention, is shown in FIG. 2. For simplicity, FIG. 2 is discussed with reference to the polymerization of ethylene polymers. Ethylene polymers are typically polymerized from ethylene, or co-polymerized with ethylene and at least one $C_3$–$C_{20}$ α-olefin, monovinylidene aromatic or hindered aliphatic comonomer. Optionally, one or more dienes may be incorporated to form, for example, what is referred to in the art as EPDM.

The polymerization unit includes a first stage reactor 40 and a second stage reactor 42. The reactors can be CSTR reactors, loop reactors, boiling reactors or any other reactor for making polyolefins, and can be single or multi-stage reactors. That is, while two reactors 40 and 42 are depicted, the subject invention applies also to single reactor and multiple reactor systems, which are designed depending on the needs of the polymer manufacturer.

Raw materials, including solvent, one or more α-olefin, such as ethylene and 1-octene, trace amounts of chain terminators such as hydrogen, and catalyst, are fed to the first stage reactor 40 through one or more feed lines 44.

A variety of commercial solvents could be used to make polyolefins such as polyethylene and ethylene copolymers. Preferred solvents include isobutane, cyclohexane, ISOPAR™ E solvent (a product and trademark of Exxon Chemical Company, typically a mix of $C_8$–$C_{10}$ hydrocarbons), and toluene. The solvent can be spiked with light components such as isobutane, isopentane and pentane.

The light solvent more readily flashes which allows the flash to achieve a higher end polymer concentration for the same feed temperature and flash pressure. Spiking with a lighter solvent also allows more of the heat of polymerization to be removed by vaporization of the solvent components for a boiling reactor system thereby reducing the recycle vapor flow (stream 83 in FIG. 3) required. The lower vapor flow, stream 83, results in smaller equipment for the vessels, exchangers, pipes and compressor which leads to lower capital costs and lower energy requirements.

The lighter component used to spike the solvent should be condensable by conventional means. Typically, for most reaction conditions, a majority of the lighter components will condense at a temperature above about 10° C., and preferably above about 25° C., and most preferably above 40° C. However, the optimum volatility of the light components depends on reactor conditions, especially reactor temperature. A low reactor temperature (for example, less than or equal to about 50° C.) would require a high volatility of the solvent component such that the optimal condensation temperature may be less than 40° C.

The amount of spiking components added is limited by the mutual solubility of the solvents and the monomers and therefore varies with the specific reaction ingredients used. Typically, the spike is added at amounts up to about 40 percent, preferably up to 30 percent and most preferably up to 25 percent. Solvents spiked with light components are preferred for use with boiling reactors.

A variety of commercial catalysts can be used to make polyolefins in the solution polymerization unit, including Ziegler-Natta catalysts, such as described in U.S. Pat. Nos. 4,314,912, 4,250,288, 4,319,011, and 4,547,475; and metallocene or constrained geometry catalysts, such as the constrained geometry catalysts described in U.S. Pat. Nos. 5,470,933, 5,556,928, and 5,512,693. An interim polymer solution produced in the first stage reactor 40 then passes from the first reactor 40 to the second reactor 42 through a connecting line 46. The interim polymer solution preferably has a polymer content from 3 percent to 16 percent by weight at the temperature of the first reactor. The polymer solution from the second stage reactor 42 typically has a polymer content from 3 percent to 24 percent by weight at the temperature of the second reactor. The polymer is insoluble at room temperature and soluble at the reactor temperatures. An interim feed line 48 optionally feeds raw materials to the second stage reactor 42 to provide more polydispersity to the polymer product.

The weight average molecular weight of polymers produced in the solution polymerization process of the invention ranges from 2,000 to 1,000,000, typically for polyethylene, 2000 to 500,000. The polydispersity of the polymer ranges from 1.5 to 10.0, from 1.5 to 2.5 in the case of the preferred polymers prepared with a metallocene or constrained geometry catalyst. Flashing the polymer solution can also facilitate the production of higher molecular weight polymers.

The polymer solution from the second stage reactor 42 passes through a discharge line 50 to a flashing vessel 52. The pressure of the polymer solution is reduced by valves 51, 57, 61, in lines 50, 56, and 60, and/or by spraying through nozzles 54. The reduction in pressure allows highly volatile components, such as solvent and unreacted ethylene, to vaporize. To avoid gel formation, the polymer solution is flashed at a temperature not greater than the temperature of the polymer solution exiting the second stage reactor 42. Volatile components exit the flashing vessel 52 through a vapor discharge line 56 for cooling and recycling. A concentrated polymer solution exits the flashing vessel 52 through a concentrate line 60 and is pumped through the polymer finishing unit.

Typically, the pressure in the flashing vessel 52 will be greater than atmospheric pressure, but will not be so great that flashing does not occur. Preferably the pressure in the flash vessel 52 will be at least 1.5 atmospheres, more preferably at least 2 atmospheres. Preferably, the pressure in the flashing vessel 52 is less than 5 atmospheres, more preferably less than 3 atmospheres.

The flashing vessel 52 reduces the temperature of the polymer solution by reducing the pressure on the solution and allowing vaporization of the most volatile components. The polymer solution is cooled because, under adiabatic conditions, it provides the heat of vaporization necessary to vaporize the most volatile components. The total thermal energy entering and exiting the flashing vessel 52 remains the same, assuming that substantial heat is not lost through the vessel walls, even though the temperature of the polymer solution drops.

In the practice of the claimed invention, a temperature drop will occur between the reactor and the flash unit. The temperature drop corresponds to the pressure drop between the reactor and the flash unit. Given the adiabatic nature of the inventive system, decreased temperatures in the flashing vessel 52 signal increased flashing. As such, the temperature drop from the second stage reactor 42 to the flashing vessel 52 will be maximized. However, to ensure that the polymer solution does not crystallize in the flashing vessel 52, conditions are preferably selected such that the temperature in the flashing vessel 52 is at least 5° C. greater, preferably at least 10° C. greater, than the crystallization temperature of the polymer solution. Typically, the flashing vessel 52 will operate at a temperature of 20 to 30° C. less than the reactor temperature.

As a further constraint, to permit flashing, the temperature of the flashing vessel 52 must be greater than the boiling point of the solvent. Preferably, the temperature of the flashing vessel 52 will be at least 20° C. greater, more preferably at least 30° C. greater, and most preferably at least 40° C. greater, than the boiling point of the solvent.

The various constraints as to pressure and temperature suggest that the solvent must be carefully selected on the basis of the reactor temperature to ensure that the process of the invention may be realized. The solvent selected should have a boiling point sufficiently low to permit flashing at the temperature present in the flashing unit. For instance, in the case of Ziegler-Natta catalysts, such catalysts may be utilized at high reactor temperatures, for example, reactor temperatures of from 150 to 210° C. Accordingly, assuming a 20° C. temperature drop between the second stage reactor 42 and the flashing vessel 52, the solvent utilized must be capable of being flashed off at a temperature of 130 to 190° C. In the case of Ziegler-Natta catalysts, an available solvent which may be employed is ISOPAR™ E mixed hydrocarbon, available from Exxon Chemical Company, which has a boiling point of 120° C.

In contrast to Ziegler-Natta catalysts, metallocene or constrained geometry catalysts often utilize lower reactor temperatures, for example, reactor temperatures of from 70 to 150° C. In this case, assuming a 20° C. temperature drop between the second stage reactor 42 and the flashing vessel 52, the solvent utilized must be capable of being flashed off at temperatures of 50 to 130° C. In the case of such lower temperature catalysts, exemplary solvents include hexane, cyclohexane, $C_6$–$C_7$ hydrocarbons, isopentane, and toluene.

The concentrated polymer solution from the flashing vessel 52 preferably has a polymer content from 25 percent to 40 percent by weight. The polymer dissolved in the solvent is substantially unchanged by the flashing vessel 52.

The polymer finishing unit shown in FIG. 2 includes a first stage heat exchanger 62 which passes the concentrated polymer solution through an entry line 64 to a first stage devolatilization vessel 66. A polymer product exits the devolatilization vessel 66 through a product line 68 and gaseous monomer and solvent vapor exit the devolatilization vessel 66 through a recycle line 70. The polymer product in product line 68 is typically 50 percent to 98 percent by weight polymer, preferably at least 70 percent to 95 percent by weight polymer, and most preferably 80 percent to 92 percent by weight polymer. Devolatilization could occur in one or more stages although only a single stage is shown in the drawings. Alternatively, polymer finishing could be accomplished by hot water washing in one or more stages. The polymer finishing unit will reduce the solvent content of the concentrated polymer solution to a sufficiently low level that the polymer may be pelletized. Typically, the finished polymer will contain no more than 2000 ppm, preferably no more than 1500 ppm, more preferably no more than 1000 ppm, and most preferably no more than 500 ppm. While the finished polymer may be characterized as having 0 ppm solvent, it will typically have at least 50 ppm solvent, with solvent levels in excess of 100 ppm being more typical.

Prior to entering the heat exchanger 62, the concentrated polymer solution is preferably heated only by the heat of polymerization. Heating and devolatilization of the polymer solution during polymer recovery can be done in one or several stages to maintain the polymer temperature below 260° C. to avoid excessive polymer degradation.

The heat exchanger 62, or a series of heat exchangers, must provide the substantial heat of vaporization necessary to volatilize essentially all of the solvent and monomer remaining in the polymer solution which enters the devolatilization vessel 66. Although it seems reasonable to add some or all of the required heat to the polymer solution prior to the first devolatilization, much of the added heat is wasted by excessive heating of the volatile components which must be cooled for recycling. Devolatilization occurs more efficiently when the volatile components are removed at temperatures just above the vaporization temperature of the components. The flashing vessel 52 of the present invention removes a substantial amount of volatile components from the polymer solution without adding heat and removes the volatile components, primarily monomer, at a low temperature which does not require substantial cooling for recycling. The significant reduction in volatile components assists in further devolatilization of the polymer solution by precluding excessive heating of the removed components. By removing the volatile components at a lower temperature following flashing of the polymer solution, the demand for heat has been substantially reduced and the demand for cooling of the volatile components and polymer product has been reduced.

To minimize polymer degradation which leads to gel formation, the polymer temperature exiting the devolatilization vessel 66 is preferably less than 225° C. Furthermore, unreacted raw materials exiting the devolatilization vessel 66 through the vapor line 68 must be cooled for recycling.

Using TiCl$_3$/MgCl$_2$ Ziegler-Natta catalysts, in the solution polymerization unit of FIG. 2, results in substantially increased polymer yield since the heat exchangers 66 do not limit the production capacity of the solution polymerization unit. Using constrained geometry catalysts or metallocene catalysts in the solution polymerization unit of FIG. 2, improves profitability of the unit in comparison to Ziegler-Natta catalysts by making a more valuable product although at a lower yield than could be achieved with Ziegler-Natta catalysts. The solution polymerization processes of the present invention are further described by the following examples which are based on simulations and compared to a conventional process to demonstrate increased polymer yields.

In another embodiment, the polymerization reaction occurs in at least one boiling reactor in which a significant portion of the solvent and/or monomer in the reactor is vaporized. The portion of solvent or monomer that is vaporized depends on the heat load generated by the exothermic polymerization reaction in the reactor. Typically, at least about 3 percent, preferably at least about 8 percent, and most preferably at least about 15 percent, of the heat of polymerization is removed by heat of vaporization of the solvent/monomer. Higher amounts of the heat of polymerization can be removed by the heat of vaporization of the solvent/monomer and still be within the subject matter of this invention.

Figure 3:
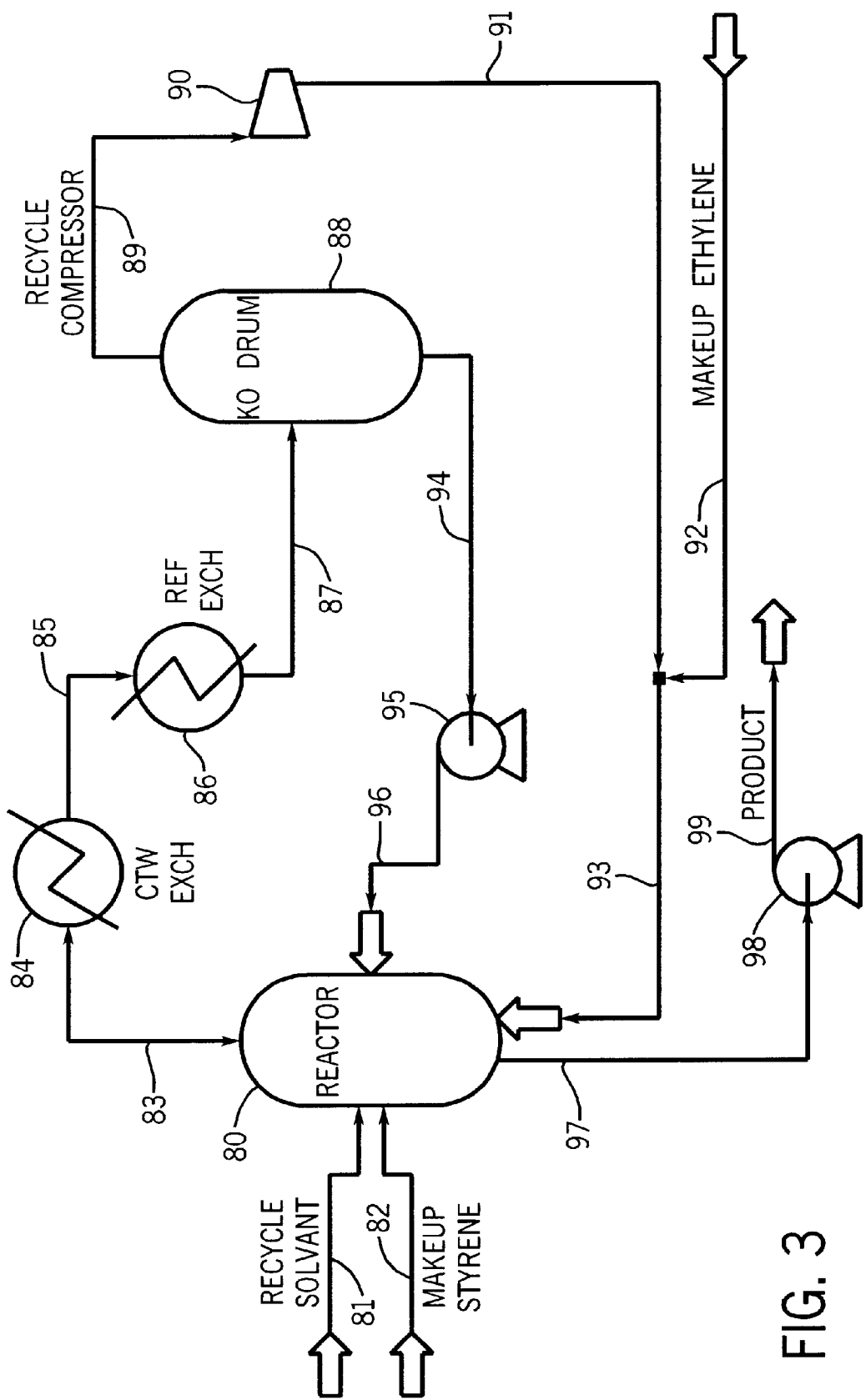
FIG. 3 is a schematic diagram of the solution polymerization reactor of either FIG. 1 or FIG. 2 wherein the reactor is a boiling reactor which has been modified for flashing the polymer reaction solution inside the reactor.

One such embodiment is shown in FIG. 3. In this embodiment, a boiling reactor 80 is supplied with ethylene, line 93, solvent, line 81, makeup monomer, line 82, and recycled/refluxed monomer, line 96. The ethylene of line 93 comprises both the recycled ethylene of line 91, and the makeup ethylene of line 92. The reaction vapor of the boiling reactor is drawn off through line 83 to a cooling tower water heat exchanger wherein the temperature of the vapor is reduced to as low as about 40° C. If further temperature reduction is required for the vapor, further cooling is provided by refrigerant or mechanical heat exchanger 86. The stream exiting the heat exchangers is in two-phases which are separated in knockout drum 88. The liquid phase from the knockout drum 88 is repressurized by pump 95 and recycled back into the reactor 80. The gas phase from the knockout drum 88 is compressed by recycle compressor 90. The compressed gas is blended with the makeup ethylene 92 prior to reentering reactor 80. The product from the boiling reactor 80 is drawn off via line 97 by pump 98.

The whole polymer product samples and the individual polymer components are analyzed by gel permeation chromatography (GPC) on a Waters 150° C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1988) to derive the following equation:

$$M_{polyethylene}=a*(M_{polystyrene})^b.$$

In this equation, a=0.4316 and b=1.0. Weight average molecular weight, $M_w$, and number average molecular weight, $M_n$, are calculated in the usual manners according to the following formula:

$$M_j=(\Sigma w_i(M_i)^j);$$

where $w_i$ us the weight fraction of the molecules with molecular weight $M_i$ eluting from the GPC column in fraction i and j=1 when calculating $M_w$ and j=−1 when calculating $M_n$.

EXAMPLE 1 (Theoretical)

A first stage CSTR reactor is continuously charged with 218,000 Kg/hr (480,000 lb/hr) of a reactant solution, at 15° C., which contains 75.6 wt percent ISOPAR™ E solvent, 8.9 wt percent 1-octene, 15.4 wt percent ethylene, and a trace amount of hydrogen. In the meantime, 54 g/hr (0.12 lb/hr) of a high efficiency Ziegler-Natta polymerization TiCl$_3$/MgCl$_2$ catalyst (refer to U.S. Pat. Nos. 4,314,912, 4,250,288, 4,319,011, 4,547,475) and triethylaluminum co-catalyst are fed into the first reactor at 15° C. The interim polymer solution from the first reactor has a temperature of 190° C. due to the heat of polymerization. The interim polymer solution also has a polymer content of 14.3 percent and is sent into a second stage CSTR reactor. There is no additional monomer, solvent, or catalyst added to the second stage reactor.

The polymer solution exiting the second stage reactor has a temperature of 210° C., again, due to the heat of polymerization. The polymer solution has a polymer content of 15.9 percent and has a polymer/ISOPAR™ E /1-octene/ethylene ratio of 15.9/75.6/7.2/1.2. This polymer solution is fed into an adiabatic flash vessel which produces a concentrated polymer solution that has a temperature of 160° C. and a polymer content of 35.1 percent.

Due to a relatively high polymer content, 34,000 Kg/hr (75000 lb/hr) of polyethylene can be produced in the finishing unit utilizing a heat transfer medium having the capacity to deliver 5.60 million Kilocalories/hr (22.2 mmBtu/hr) for post reactor heat-exchangers. This assumes that the outlet temperature of the first stage devolatilization is 190° C.

EXAMPLE 2 (Comparative Theoretical)

A first stage CSTR reactor is continuously charged with 151,000 Kg/hr (333,000 lb/hr) of a reactant solution, at 15° C., which contains 75.6 wt percent ISOPAR™ E solvent, 8.9 wt percent 1-octene, 15.4 wt percent ethylene, and a trace amount of hydrogen. In the meantime, 38 g/hr (0.083 lb/hr) of a high efficiency Ziegler-Natta polymerization TiCl$_3$/MgCl$_2$ catalyst (refer to U.S. Pat. Nos. 4,314,912, 4,250,288, 4,319,011, 4,547,475) and triethylaluminum co-catalyst also were fed into the first stage reactor at 15° C. The interim polymer solution exiting the first reactor has a temperature of 190° C. due to the heat of polymerization. The interim polymer solution has a polymer content of 14.3 percent and is sent to a second stage CSTR reactor. There is no additional monomer, solvent, or catalyst added to the second stage reactor.

The polymer solution exiting the second stage reactor has a temperature of 210° C., again, due to the heat of polymerization. The polymer solution has a solids content of 15.9 percent and has a polymer/ISOPAR™ E/1-octene/ethylene ratio of 15.9/75.6/7.2/1.2. Due to a relatively low solids content, 23,800 Kg/hr (52,500 lb/hr) of polyethylene can be produced utilizing a heat transfer medium having the capacity to deliver 5.6 million Kilocalories/hr (22.2 mmBtu/hr). This assumes that the outlet temperature of the first devolatilization unit is 190° C.

EXAMPLE 3 (Theoretical)

A first stage CSTR reactor is continuously charged with 116,000 Kg/hr (256,000 lb/hr) of a reactant solution, at 25° C., which contains 87.3 wt percent ISOPAR™ E solvent, 4.5 wt percent 1-octene, 8.2 wt percent ethylene, and a trace amount of hydrogen. In the meantime, 14 g/hr (0.032 lb/hr) of a single site constrained geometry polymerization catalyst (refer to U.S. Pat. Nos. 5,470,933, 5,556,928, 5,512,693) is fed into the first stage reactor at 25° C. The interim polymer solution exiting the first stage reactor has a temperature of 115° C. due to the heat of polymerization. The interim polymer solution also has a polymer content of 7.0 percent and is delivered into a second stage CSTR reactor.

The second stage reactor continues polymerization of the interim polymer solution with a high efficiency Ziegler-Natta polymerization $TiCl_3/MgCl_2$ catalyst (refer to U.S. Pat. Nos. 4,314,912, 4,250,288, 4,319,011, 4,547,475) and triethylaluminum co-catalyst. In addition, 56,600 Kg/hr (125,000 lb/hr) of an interim reactant solution, with 87.5 wt percent, ISOPAR™ E, 3.74 wt percent of 1-octene, and 22.49 wt percent of ethylene at 45° C., is charged to the second stage reactor. The polymer solution exiting the second stage reactor has a temperature of 194.5° C., again, due to the heat of polymerization. The polymer solution has a polymer content of 13.0 percent and has a polymer/ISOPAR™ E/1-octene/ethylene ratio of 13.0/82.8/3.0/1.1. This polymer solution is then fed into an adiabatic flash vessel which produces a concentrated polymer solution having a polymer content of 29.2 percent, a temperature of 160° C., and a pressure of 37 Psia.

Due to a relatively high solids content, 22,500 Kg/hr (49,600 lb/hr) of polyethylene can be produced utilizing a heat transfer medium having the capacity to deliver 5.0 million Kilocalories/hr (20.0 mmBtu/hr). This assumes that the outlet temperature of the first stage devolatilization is 190° C.

EXAMPLE 4 (Comparative Theoretical)

A first stage CSTR reactor is continuously charged with 71,900 Kg/hr (159,000 lb/hr) of reactant solution, at 25° C., which contains 87.3 wt percent/ISOPAR™ E solvent, 4.5 wt percent 1-octene, 8.2 wt percent ethylene, and a trace amount of hydrogen. In the meantime, 14 g/hr (0.032 lb/hr) of a single site constrained geometry polymerization catalyst (refer to U.S. Pats. No. 5,470,933, 5,512,693, 5,556,928) is fed into the first stage reactor at 25° C. The interim polymer solution exiting the first reactor has a temperature of 115° C. due to the heat of polymerization. The interim polymer solution has a polymer content of 7.0 percent and is fed to a second stage spherical reactor.

The second stage reactor continues polymerization of the interim polymer solution with a high efficiency Ziegler-Natta polymerization $TiCl_3/MgCl_2$ catalyst (refer to U.S. Pat. Nos. 4,314,912, 4,250,288, 4,319,011, 4,547,475) and triethylaluminum co-catalyst. In addition, 35,100 Kg/hr (77,300 lb/hr) of an interim reactant solution, with 87.5 wt percent ISOPAR™ E, 3.74 wt percent of 1-octene, and 22.5 wt percent of ethylene at 45° C. is charged to the second reactor. The polymer solution exiting the second reactor has a temperature of 194.5° C., again, due to the heat of polymerization. The polymer solution has a polymer content of 13.0 percent and has a polymer/ISOPAR™ E/1-octene/ethylene ratio of 13.0/82.8/3.0/1.1. Due to a relatively low polymer content, 14,100 Kg/hr (31,000 lb/hr) of polyethylene can be produced utilizing a heat transfer medium having the capacity to deliver 5.0 million Kilocalories/hr (20.0 mmBtu/hr). This assumes that the outlet temperature of the first stage devolatilization is 190° C.

Comparison of Examples 1 and 2 shows that the polymer production capacity of the solution polymerization unit is significantly increased about 43 percent by adding the flashing vessel to debottleneck polymer recovery which enables production of more polyethylene from the Ziegler-Natta catalyst. A fixed amount of energy is supplied to the polymer recovery units in both Examples. Comparison of Examples 3 and 4 similarly shows a 60 percent increase in polymer production capacity by adding a flashing vessel which enables production of more polyethylene from a process which uses a metallocene catalyst in a first stage reactor and a Ziegler-Natta catalyst in a second stage reactor.

EXAMPLE 5 (Boiling reactor theoretical)

This example refers to FIG. 3. Ethylene, at a temperature of 50° C. and a pressure of 600 psi, is added through make up line 92 to reactor 80 at a rate of 14,580 lb/hr. Styrene, at a temperature of 10° C. and a pressure of 475 psi is introduced into the reactor 80 via line 82 at a rate of 48,600 lb/hr. Recycled toluene, a solvent, at a temperature of 10° C. and a pressure of 475 psi is added to the reactor 80 through line 81 at a rate of about 180,000 lb/hr. The reaction vapor, at a temperature of 100° C. and a pressure of about 92 psi, is drawn through the line 83 at a rate of about 83,000 lb/hr. The two phase stream in line 87 has a temperature of 10° C. and a pressure of about 88 psi. The flow of recycle line 94 and 96 is about 27,000 lb/hr. The flow of recycle line 89 and 91 is about 56,000 lb/hr and is compressed by compressor 90 to a pressure of over 100 psi. The product flow, line 97, is about 243,000 lb/hr at a temperature of about 100° C. and a pressure of about 93 C. The polymer portion of product flow, line 97, is 48,600 lb/hr (20 percent by weight polymer). The polymer generated is an ESI with mole fractions 0.45 styrene and 0.55 ethylene. The polymer has an $M_n$ value of 10,000 and an $M_w$ value of 20,000.

In comparison, a typical, non-boiling adiabatic CSTR operated at a temperature of about 100° C. with a feed temperature of 10° C. would have generated a polymer solution of approximately 12.3 percent by weight polymer for the same ESI product.

As an alternative to improving polymer yields, the solution polymerization process of the present invention allows the polymerization reactors to operate at higher solvent content to produce higher molecular weight polymers. The flashing vessel 52 would separate and recirculate additional solvent charged to the reactor and allow the reactors to be operated in a manner to produce polymers with increasing molecular weight without increasing the solids content of the polymer solution exiting the reactors.

Both higher molecular weight and increased polymer yield can be achieved by using the excess reactor capacity made available by the flashing vessel 52 to increase both the total charge of each raw material and further increase the charge of solvent.

While the foregoing is directed to preferred embodiments of the present invention, other and further embodiments of the invention may be devised without departing from the basic scope thereof, and the scope thereof is determined by the claims which follow.

What is claimed is:

1. A solution polyolefin process, comprising the steps of:
   a) polymerizing one or more olefin monomers in at least one boiling reactor in a sufficient amount, of solvent to produce a polymer solution within the boiling reactor having a solids content from 3% to 24% by weight and wherein the polymer solution has a temperature of about 150° to about 260° C.;
   b) flashing the polymer solution, without preheating, to produce a concentrated polymer solution having a reduced temperature and a polymer content from 10% to 40% by weight where the flashing occurs inside the boiling reactor;
   c) heating the concentrated polymer solution; and
   d) finishing the heated concentrated polymer solution to produce a finished polymer having a solvent content of from 0 to 2000 ppm.

2. The method of claim 1 wherein the polymer solution comprises a polymer having a weight average molecular weight from 2,000 to 1,000,000.

3. The method of claim 1 wherein the step of polymerizing the olefin monomers occurs in a first stage reactor and at least one second stage reactor.

4. The method of claim 3 wherein the olefin monomers are introduced to both the first stage reactor and second stage reactor.

5. The method of claim 1 wherein at least one of the olefin monomers is an α-olefin.

6. The method of claim 1 wherein the polymer is polyethylene.

7. The method of claim 1 where the polymer content is from 25% to 40% by weight, upon the flashing of step b).

8. A solution polyethylene process, comprising the steps of:
   a) polymerizing ethylene in a sufficient amount of solvent to produce a polymer solution having a polymer content from 3% to 24% by weight, wherein the polymer solution comprises polyethylene having a weight average molecular weight from 2,000 to 500,000;
   b) adiabatically flashing the polymer solution to produce a concentrated polymer solution having a polymer content from 10% to 40% by weight;
   c) heating the concentrated polymer solution; and
   d) devolatilizing the heated concentrated polymer solution, wherein the step of polymerizing the ethylene occurs in a first stage reactor and a second stage reactor and at least one of the first stage reactor and the second stage reactor is a boiling reactor and the flashing of the polymer solution occurs within the boiling reactor.

9. The method of claim 8 wherein the step of adiabatically flashing the polymer solution occurs at a temperature of at least 20° C. greater than the crystallization temperature of the concentrated polymer solution.

10. The method of claim 9 wherein the ethylene is introduced to both the first stage reactor and the second stage reactor.

11. The method of claim 8 wherein the ethylene is co-polymerized with at least one $C_3$–$C_{20}$ α-olefin, monovinylidene aromatic or hindered aliphatic comonomer, and optionally with one or more diones.

12. The method of claim 8 wherein the step of flashing the polymer solution follows directly after the step of polymerizing ethylene.

13. The method of claim 8 wherein the polymer content of the concentrated polymer solution of step (b) is from 25% to 40% by weight.

14. The method of claim 8 wherein flashing occurs at a pressure of at least 1.5 atmospheres.

15. A solution polyolefin process, comprising the steps of:
   a) polymerizing one or more α-olefin monomers in a sufficient amount of solvent in a first stage reactor to produce a first stage polymer solution having an interim polymer content less than 16% by weight;
   b) polymerizing the concentrated polymer solution from step c) in a second stage reactor to produce a second stage polymer solution, wherein the polymer solution comprises a polymer having a weight average molecular weight from 2,000 to 500,000;
   c) flashing the first stage polymer solution to produce a concentrated polymer solution having a polymer content from 10% to 40% by weight wherein the flashing occurs between the first stage reactor and the second stage reactor;
   d) heating the second stage polymer solution; and
   e) finishing the heated second stage polymer solution to produce a finished polymer having a solvent content of from 0 to 2000 ppm.

16. The process of claim 15 wherein the step of flashing the polymer solution occurs adiabatically at a temperature of at least 20° C. greater than the crystallization temperature of the concentrated polymer solution.

17. The process of claim 15 wherein the α-olefin monomers are introduced to both the first stage reactor and the second stage reactor.

18. The process of claim 15 wherein the polymer has a polydispersity from 1.5 to 10.0.

19. The process of claim 15 wherein the polymer content of the concentrated polymer solution of step (c) is from 25% to 40% by weight.

20. The process of claim 15 wherein flashing occurs at a pressure of at least 1.5 atmospheres.

21. The process of claim 15 wherein at least one of the first stage reactor or the second stage reactor is a boiling reactor.

22. The process of claim 21 wherein flashing of the first stage polymer solution occurs within the boiling reactor.

23. The process of claim 15 wherein the polymer content of the concentrated polymer solution of step (c) is from 25% to 40% by weight.

24. The process of claim 15 wherein flashing occurs at a pressure of at least 1.5 atmospheres.

* * * * *